Aug. 2, 1955 J. G. KOEHLER 2,714,335
PORTABLE BOX LIDDING MACHINE
Filed Nov. 16, 1953 3 Sheets-Sheet 1
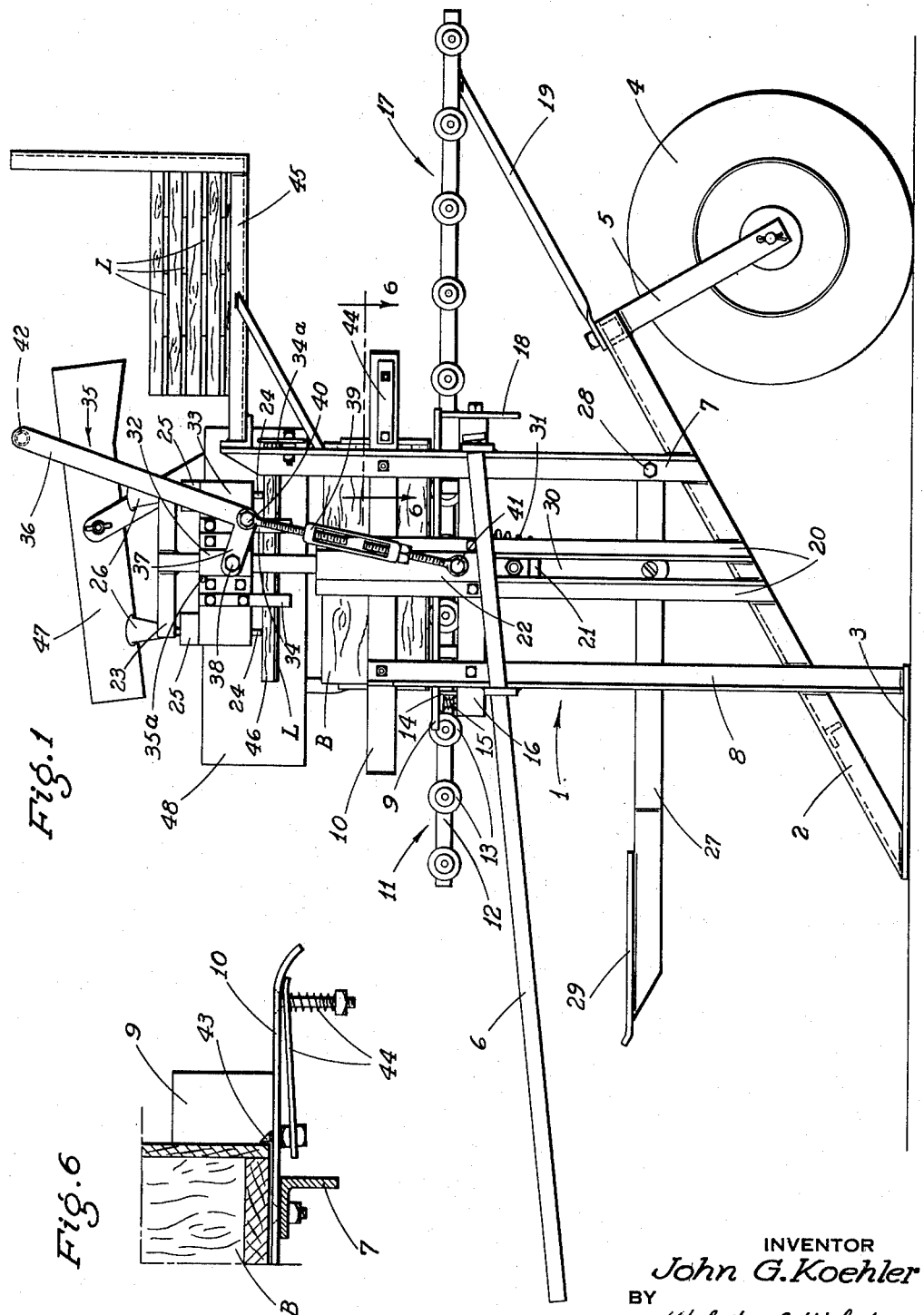
INVENTOR
John G. Koehler
BY
Webster & Webster
ATTYS

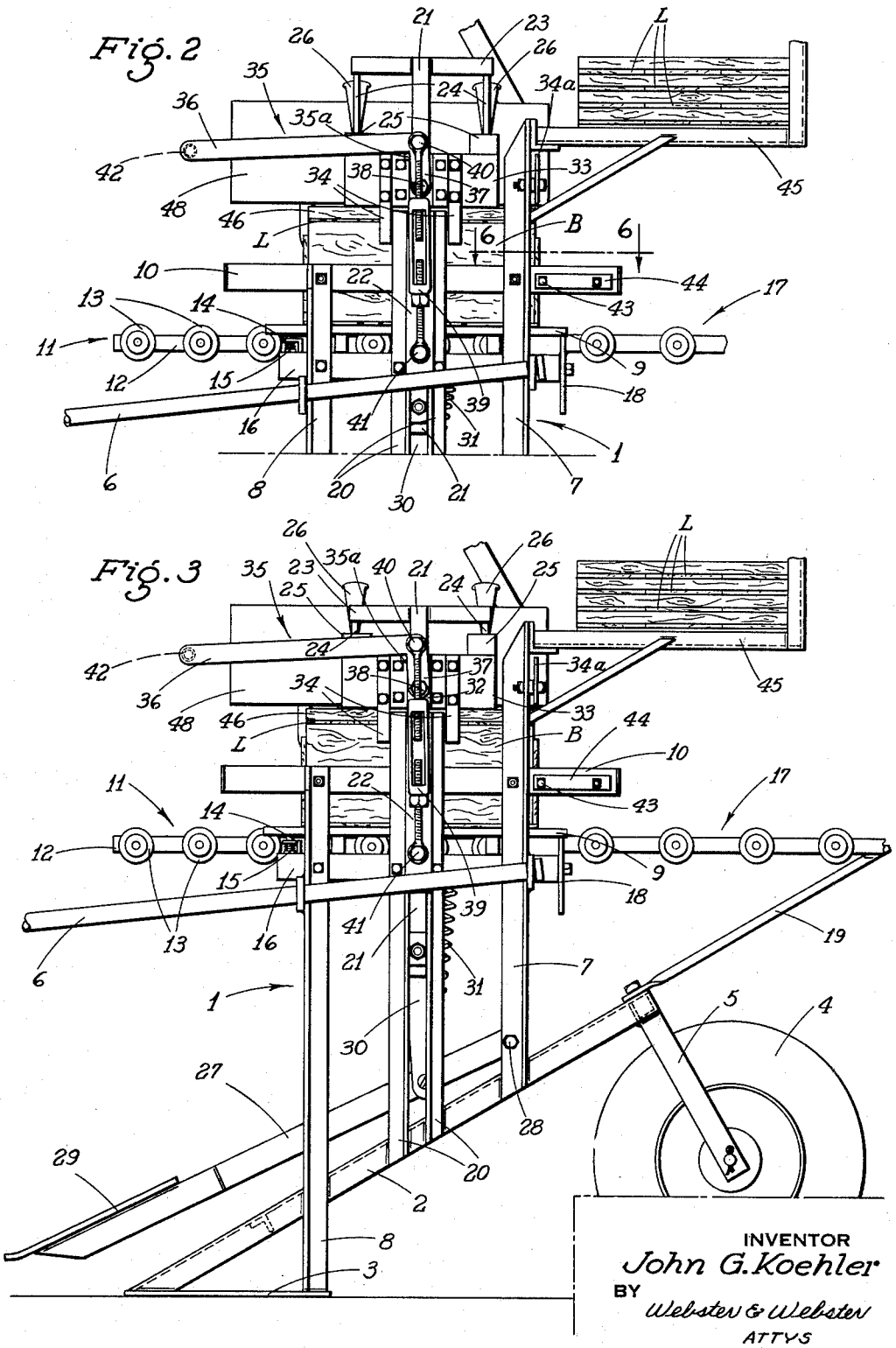

Aug. 2, 1955  J. G. KOEHLER  2,714,335
PORTABLE BOX LIDDING MACHINE
Filed Nov. 16, 1953  3 Sheets-Sheet 3

INVENTOR
John G. Koehler
BY Webster & Webster
ATTYS

United States Patent Office 2,714,335
Patented Aug. 2, 1955

2,714,335

PORTABLE BOX LIDDING MACHINE

John G. Koehler, Lodi, Calif.

Application November 16, 1953, Serial No. 392,441

11 Claims. (Cl. 1—10)

This invention is directed to, and it is a major object to provide, a portable box lidding machine of novel construction and function; the machine being especially designed—but not limited—for use in the field to lid boxes of fresh produce which is field packed. By packing and lidding in the field a substantial economy is effected over the practice of trucking the produce to a packing shed for the purpose of there boxing the produce and lidding the boxes.

Another important object of this invention is to provide a portable box lidding machine whose working parts are actuated wholly by the operator so that the machine is capable of use as in a field, where a source of electric power is usually unavailable.

An additional object of the invention is to provide a portable box lidding machine which is relatively small, compact, and readily movable—wheelbarrow-like—from place to place in the field so as to dispose the machine for convenience of use adjacent the point of field packing the fresh produce in the boxes.

A further object of the invention is to provide a portable box lidding machine which embodies a hand actuated, box lid locating and hold-down unit, and a foot pedal actuated box lid nailing unit; said units being associated with each other and supported from a main frame in novel manner.

A still further object of the invention is to provide the machine with a novel nailing anvil and conveyor assembly for the box to be lidded; there being a guide and stop arrangement to properly locate each box in lid nailing position.

It is also an object of the invention to provide a portable box nailing machine which is designed for ease and economy of manufacture; the machine being rugged in its structure and capable of long use with a minimum of servicing or repair being required.

Still another object of the invention is to provide a practical and reliable portable box lidding machine, and one which will be exceedingly effective for the purpose for which it is designed.

These objects are accomplished by means of such structure and relative arrangement of parts as will fully appear by a perusal of the following specification and claims.

In the drawings:

Fig. 1 is a side elevation of the machine as in use: the box being shown in position in the machine, and the lid locating and hold-down unit, together with the box lid nailing unit, being in raised or starting position.

Fig. 2 is a fragmentary side elevation showing the lid locating and hold-down unit in its lowered, operative position, but with the box lid nailing unit remaining raised.

Fig. 3 is a similar view showing both the box lid locating and hold-down unit, and the box lid nailing unit, in lowered position, as when the lid is nailed onto the box.

Fig. 6 is an enlarged fragmentary sectional plan view on the line 6—6 of Fig. 1.

Figure 4:
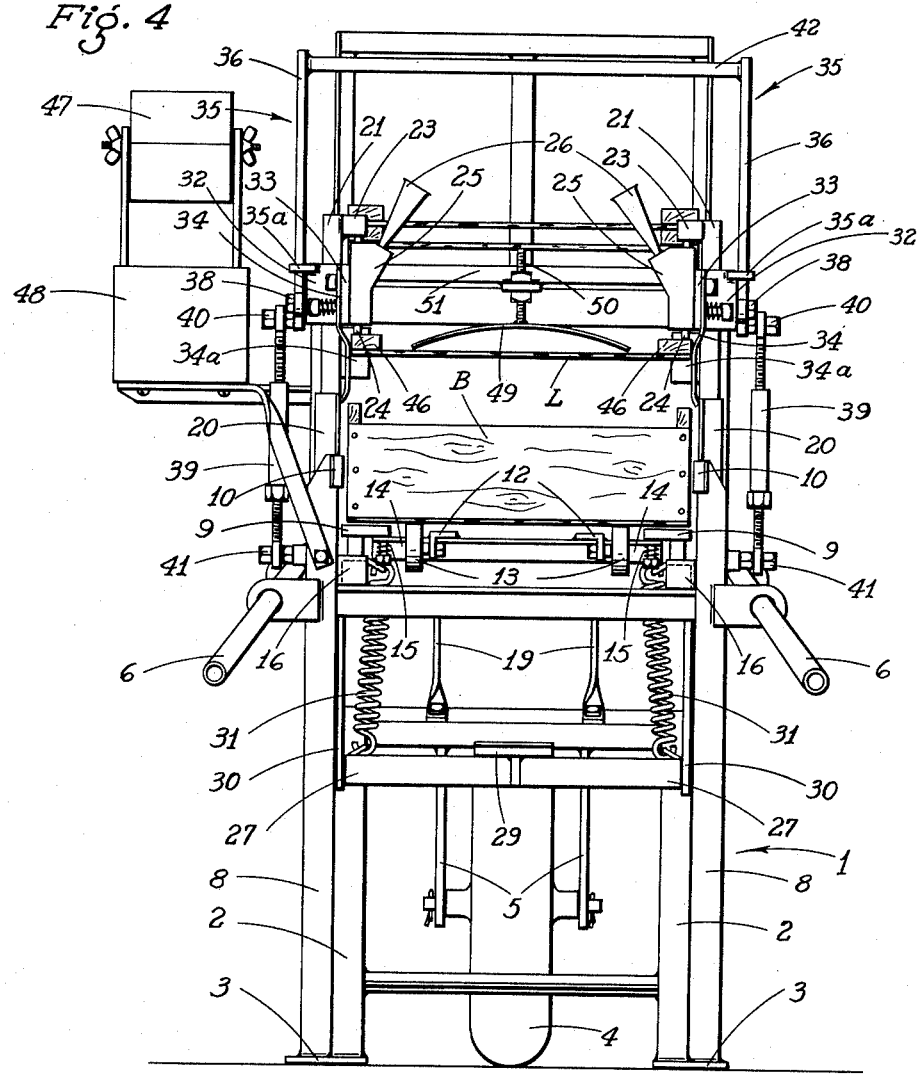
Fig. 4 is a rear elevation of the machine with the parts disposed as in Fig. 1.
Figure 5:
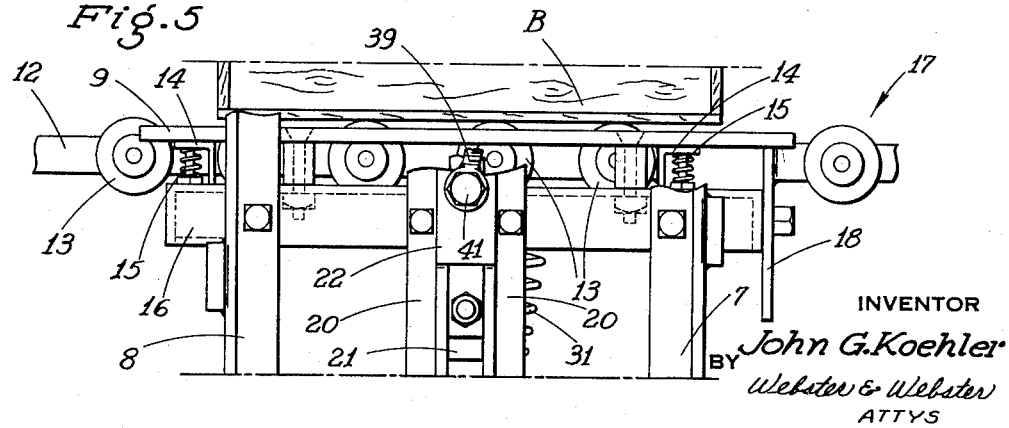
Fig. 5 is an enlarged fragmentary side elevation, with the parts broken away, showing the yieldable mounting of the box conveyor which is associated with the anvils.

Referring now more particularly to the characters of reference on the drawings, the portable box lidding machine comprises an upstanding skeleton frame, indicated generally at 1, which frame is supported from its lower end by rigidly connected, upwardly inclined side bars 2 which are secured at the lower end to ground engaging feet 3. The side bars 2 are supported at the forward and upper end by a central, rubber tire wheel 4 carried in a fork 5. Transversely spaced handles 6 are attached to opposite sides of the frame 1 and project rearwardly therefrom, whereby the machine may be moved—wheelbarrow-like—from place to place by the operator.

The upstanding skeleton frame 1 is generally rectangular in plan and includes front posts 7 and rear posts 8. At substantially waist or bench height the upstanding frame 1 is fitted, on opposite sides, with horizontal, longitudinally extending anvils 9 fixed in connection with and spanning between the corresponding front and rear posts 7 and 8.

Above each anvil 9 the frame 1 is fitted, on each side, with a horizontal, longitudinally extending, inwardly facing guide 10 outturned at the ends, as shown, to facilitate the entry of a box B into the machine between said guides 10 and above the anvils 9 in the manner as will hereinafter appear.

A roller conveyor section, indicated generally at 11, is associated with the anvils 9 and projects rearwardly a short distance from the frame 1; said roller conveyor section including a horizontal frame 12 and rollers 13 which normally project above the top surface of the anvils 9 from a position inwardly of corresponding ones thereof. Thus, normally the rollers 13 will support a box B for easy rolling entry into, or removal from, the machine.

The roller conveyor section 11 is, however, downwardly yieldably mounted so that when a box B is disposed in the machine in lid nailing position, as will hereinafter appear, said box may be depressed into positive engagement with the anvils 9.

To accomplish this the frame 12 of roller conveyor 11 includes transverse front and rear angle irons 14 which are downwardly yieldably spring-supported, as at 15, from the anvils 9; the latter being fixedly mounted in connection with longitudinal frame bars 16 included in the sides of the frame on the inner faces of said sides.

In addition to the roller conveyor section 11, which is downwardly yieldable relative to the anvils 9, the machine also includes a fixed forwardly projecting roller conveyor section, indicated generally at 17; the section 17 providing a normally alined, forwardly projecting extension of the section 11; the section 17 being fixed at its inner end by brackets 18 bolted to the front ends of the bars 16. The outer end of the roller conveyor section 17 is supported from the side bars 2 by a diagonal brace structure 19.

The upstanding skeleton frame 1 is open front to rear, for a substantial distance above the anvils 9, to permit of the passage of a box B through the machine on the described conveyor sections.

On each side centrally between posts 7 and 8, the frame 1 includes a pair of vertical angle iron guide rails 20 disposed in adjacent but spaced parallel relation.

A vertically slidable post 21 is disposed between the guide rails 20 at each side of the frame 1, and each such post is maintained against outward displacement from between the related guide rails by a cover plate 22 fixed to the outside of, and spanning between, said rails at the upper portion thereof. Inward displacement of each of the posts 21 is prevented by the related guide 10 and bar 16 which intersect said rails 20 at the inner face thereof.

At their upper ends each post 21 is fitted with a longitudinally extending top bar 23, and each such top bar has a pair of longitudinally spaced nailing plungers 24 fixed to and depending therefrom.

The nailing plungers 24 work through nailing chucks 25 mounted and actuated as will hereinafter appear; each such nailing chuck including a nail receiving and feed tube or funnel 26.

A swing foot-pedal frame 27 is pivoted, at its forward end, as at 28, to the front post 7, and thence extends through the frame 1 to a termination rearwardly of the latter; such swing frame 27 as so mounted being swingable from a raised position, as in Fig. 1, to a depressed position, as in Fig. 3.

A foot pedal 29 is mounted centrally on the rear end of the swing frame 27 in position for foot engagement by an operator standing at the rear of the machine.

A pair of links 30 are pivotally connected between the lower ends of the posts 21 and the swing frame 27 intermediate the ends of the latter; tension springs 31 being connected between the swing frame 27 and the bars 16 whereby to normally but yieldably maintain said swing frame 27 in its raised position, with the posts 21, top bars 23, and nailing plungers 24 in a corresponding raised position. The assembly of these parts may be termed the foot pedal actuated box lid nailing unit of the machine.

The machine also includes a hand actuated box lid locating and hold-down unit which comprises the following:

Above the upper ends of the guide rails 20 each post 21 carries a slide collar 32, and each such slide collar 32 has a longitudinally extending, inwardly facing mounting plate 33 affixed thereon inwardly of the related post; the nailing chucks 25 being fixed to said mounting plates 33.

The mounting plates 33 are each fitted on the outside with a pair of longitudinally spaced, depending, spring-type lid retention and flushing fingers 34, which fingers are deformed so that they bow inwardly; i. e., toward each other in the portion of the fingers which lies below said mounting plates.

A bellcrank lever, indicated generally at 35, is disposed adjacent and to the outside of each slide collar 32; each such bellcrank lever including a normally upstanding, relatively long leg 36, and a relatively short, normally rearwardly projecting leg 37. Each of the rearwardly projecting legs 37 is pivoted, as at 38, to the related slide collar 32, and an adjustable link 39, in the form of a turnbuckle, pivotally connects between the knee of each bellcrank lever 35, as at 40, and a fixed point therebelow on the corresponding cover plate 22, as at 41.

The legs 36 of the bellcrank levers 35 are connected at the top by a cross handle 42.

It will be recognized that upon swinging of the legs 36 of the bellcrank levers 35, by pulling rearwardly on the cross handle 42, the legs 37 will act through the slide collars 32 to shift the mounting plates 33 and chucks 25 from a normally raised position, as in Fig. 1, downwardly to a lowered position, as in Fig. 2.

In use of the above described portable box lidding machine, each operation is begun with all of the parts in their raised position, a box B to be lidded being moved horizontally into the frame 1 preferably from the roller conveyor section 17; proper front to rear location of the box being assured by reason of stops 43 against which the box engages at the front end. The stops 43 project through the guides 10, being yieldably spring-urged inwardly by means of the arrangement shown at 44. When each box moves into the frame 1 to rest on the conveyor section 11 above the anvils 9, from the roller conveyor section 11, the stops are merely deflected laterally outwardly and thence spring back into position to stop and locate the box against forward displacement.

After each box B is so located above the anvils 9 a box lid L is taken from a stack thereof on a box lid shelf 45 and is inserted between the lid retention and flushing fingers 34 below the mounting plates 33. A lid L is thus frictionally supported above the in-place box B; stops 34a properly locating the lid front to rear.

The operator then grasps the cross handle 42 and swings the same rearwardly and downwardly, causing the bellcrank levers 35 to turn about the pivots 40, which results in the legs 37 forcefully shifting the slide collars 32 downwardly on the posts 21.

When this occurs the mounting plates 33, chucks 25, and fingers 34 all move downwardly in unitary relation until the supported lid L bears directly on the in-place box B. During this operation the fingers 34 properly flush the lid L to the box B, and the chucks 25 move down to rest firmly in nailing position on the end cleats 46 of the lid; there being sufficient continued motion of the chucks 25 so that the box depresses the roller conveyor section 11 and rests at the bottom firmly on the nailing anvils 9.

When the parts reach their lowered position, as above, the throw-over handle comprised of the cross handle 42 and bellcrank levers 35 is in an over-dead-center position relative to the links 39 (see Figs. 2 and 3), so that said levers cannot accidentally return to their raised or starting position. In such over-dead-center position the bellcrank levers 35 rest against stops 35a secured on the mounting plates 33. This assures that the lid L is effectively clamped on the box B preparatory to the nailing operation, which is accomplished as follows:

The operator withdraws a number of nails from a conventional nail stripper 47 mounted in connection with, and disposed above, a nail supply box 48 supported from the frame 1 to one side of the machine. The nails as removed by hand from the stripper 47 are then deposited one each in the nail receiving tubes or funnels 26; the nailing plungers 24 at this time remaining relatively raised by reason of the fact that the chucks 25 have been moved downward to nailing position atop the box engaging lid, as previously described.

After the nails are deposited in the nail receiving tubes or funnels 26, the operator places one foot on the pedal 29 and forcefully depresses the same, swinging the frame 27 downwardly, which imparts a downward sliding motion to the posts 21, correspondingly lowering the top bars 23; the latter driving the nailing plungers 24 through the chucks 25, so that such plungers nail the lid L to the box B.

In order to assure that the pack of produce in the box (which pack is here omitted) does not unduly bow the lid L upwardly when said lid is moved into engagement with the box preparatory to the nailing operation, the box lid nailing unit includes a crown plate 49 carried on a vertically adjustable stud 50 secured in connection with a cross member 51 which is fixed in connection with, and spans between, the mounting plates 33. When the nailing chucks 25 are moved to their lowered or nailing position against the lid L, with the latter resting on the box B, the crown plate 49 bears on the lid L to assure against undue upward deflection of such lid as it is pressed against the pack.

After each nailing operation the foot pedal 29 is released, whereupon the parts which comprise the box lid nailing unit are returned upwardly to their starting positions by means of the tension springs 31 which pull upwardly on the swing frame 27. Thereafter, the operator swings the handle unit, comprised of the cross handle 42 and bellcrank levers 35, forwardly and upwardly to starting position, which raises the box lid locating and hold-down unit upwardly to its starting position—i. e. the chucks 25 and spring fingers 34 raise to a clearance position above the then lidded box—the latter being drawn out of the machine on the roller conveyor section 11, and thence removed preparatory to nailing the next box.

The above described portable box lidding machine makes possible the convenient and rapid lidding of boxes in the field and closely adjacent the point of picking of the produce and packing of such boxes; the machine working smoothly and positively without undue effort on the part of the operator.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention the following is claimed as new and useful, and upon which Letters Patent are desired:

1. A box lidding machine comprising an upstanding frame, an anvil assembly mounted on the frame to support a box for lidding, transversely spaced vertical posts slidably mounted on the frame and normally in a raised position, the anvil assembly being disposed between the posts intermediate their ends, slide collars on the posts in a normally raised position above the anvil assembly, nailing chucks disposed in position to engage a lid on the box upon a down stroke of said slide collars, means mounting the chucks in fixed connection with the collars, the chucks including normally raised nailing plungers slidable therein, means securing the plungers to the related posts for a down stroke therewith, a throw-over handle unit pivotally connected to the frame and to the collars and arranged for swinging to impart a simultaneous down stroke to said collars and chucks, said handle unit including parallel bellcrank levers disposed at opposite sides of the frame, a cross handle spanning over the frame and connecting between normally upstanding legs of said levers, the other legs of said levers being pivoted to adjacent slide collars, and links pivotally connecting between the knees of the bellcrank levers and points on the frame therebelow; and a depressible foot pedal pivotally connected to the frame and linked to the posts and arranged to impart a simultaneous down stroke to said posts and nailing plungers after the down stroke of said collars and chucks.

2. A box lidding machine, as in claim 1, in which the bellcrank levers are over dead center and in a releasable holding position when the handle unit is swung to dispose the slide collars and chucks at the end of the down stroke thereof.

3. A box lidding machine comprising an upstanding frame, an anvil assembly mounted on the frame to support a box for lidding, transversely spaced vertical posts, means slidably mounting the posts on the frame, the anvil assembly being disposed between the posts intermediate their ends, slide collars on the posts in a normally raised position above the anvil assembly, nailing chucks, plates supporting the chucks and fixed with the slide collars in position to engage a lid on the box upon a down stroke of said slide collars, the chucks including normally raised nailing plungers slidable therein, means securing the plungers to the related posts for a down stroke therewith, a throw-over handle unit pivotally connected to the frame and to the collars and arranged for swinging to impart a simultaneous down stroke to said collars and chucks, and to releasably hold said collars and chucks at the end of said down stroke, a vertically swingable foot-pedal frame pivotally connected to the frame below the anvil assembly and including a foot pedal, links pivotally connecting the posts and said swingable frame, and means yieldably holding the swingable frame in raised position; down-swinging of the frame by the foot pedal, after the down stroke of said collars and chucks, imparting a simultaneous down stroke of the posts and nailing plungers from an initially raised position thereof.

4. A box lidding machine comprising an upstandinng frame having spaced sides, an anvil assembly mounted in the frame between said sides to support a box for lidding, a normally raised slidable post on each side of and projecting above the frame, means on the frame guiding each post for vertical movement a normally raised slide collar on the projecting portion of each post, an inwardly facing mounting plate on each slide collar, chucks fixed on the mounting plates adapted to engage a lid on the box upon a down stroke of the slide collars and mounting plates, a throw-over handle unit spanning above the frame and including a bellcrank lever adjacent and pivoted at the end of one leg to each slide collar, each bellcrank lever having a normally upstanding leg, a cross handle connecting said normally upstanding legs, and a link pivotally connected between the knee of each bellcrank lever and a point therebelow on the corresponding side of the frame, throw-over motion of the handle unit in one direction causing the bellcrank levers thereof to impart a down stroke of the slide collars and chucks; the chucks including normally raised nailing plungers, bars on the posts above the chucks connecting the plungers to corresponding ones of said posts for a down stroke therewith; and foot pedal actuated means connected between the frame and posts arranged to impart a simultaneous down stroke to said posts.

5. A box lidding machine, as in claim 4, including spring-type lid retention and flushing fingers depending from each of the mounting plates below the chucks.

6. A box lidding machine comprising an upstanding frame, anvils supported on the frame for receiving a box with a lid thereon, vertical side posts laterally out from the anvils, means guiding the posts on the frame for vertical movement, a lid nailing unit including nail chucks above the anvils and nailing plungers cooperating with the chucks, chuck supports slidable on the posts, plunger mounting bars fixed on the posts, hand actuated means connected to the frame and supports to raise and lower the latter, and separate manually actuated means connected to the frame and posts to lower the latter from a normally raised position.

7. A machine as in claim 6 in which said hand actuated means includes an over dead center mechanism operative to releasably hold said supports at the end of their down stroke.

8. A machine as in claim 6 in which said hand actuated means includes a swingable hand unit having an over dead center position in which it releasably holds said supports at the end of their down stroke.

9. A machine as in claim 6 in which said hand actuated means includes a swingable hand unit comprising a bellcrank lever assembly having an over dead center position in which said assembly holds said supports at the end of their down stroke.

10. A machine as in claim 6 in which said hand actuated means includes a swingable hand lever arranged to impart a down stroke to the supports and chucks, and said manually actuated means comprises a depressible foot pedal whose depression pulls the posts and plungers down from an initially raised position.

11. In a box lidding machine which includes an upstanding frame, transversely spaced anvils mounted in the frame, and a nailing mechanism mounted on the frame above the anvils, a longitudinal conveyor extending lengthwise between the anvils, to convey boxes to and past the anvils and terminating in a discharge end a predetermined distance beyond the frame, and means to actuate the nailing mechanism including a foot-pedal swing frame mounted on the frame below and extending lengthwise of the conveyor and including a pedal disposed in a transverse plane adjacent but beyond the discharge end of said conveyor.

References Cited in the file of this patent
UNITED STATES PATENTS

| | | |
|---|---|---|
| 1,906,289 | Twomley | May 2, 1933 |
| 1,935,814 | Paxton | Nov. 21, 1933 |
| 1,963,377 | Paxton | June 19, 1934 |
| 2,573,540 | Cavanaugh | Oct. 30, 1951 |